Patented Feb. 17, 1942

2,273,564

UNITED STATES PATENT OFFICE 2,273,564

DIAMINO BENZYL ALCOHOLS AND PROCESS FOR MAKING SAME

Joseph B. Dickey and James G. McNally, Rochester, N. Y., assignors to Eastman Kodak Company, Rochester, N. Y., a corporation of New Jersey No Drawing. Application April 21, 1939, Serial No. 269,218

10 Claims. (Cl. 260—574)

This invention relates to nuclear-substituted phenylenediamine compounds and more particularly to phenylenediamine compounds in which the benzene rings are substituted in the meta position by a hydroxy-alkyl group and some of the hydrogen atoms in one of the amino groups replaced by various substituents.

The novelty and advantages of our invention will be more apparent from the following brief consideration of the state of the art. It is well-known that the preparation of certain meta-substituted aryl compounds present difficulties. For example, it is known that when toluene is nitrated, the maximum yield of the meta-nitrotoluene is less than 6%. All of this meta-nitro-toluene probably would not be recoverable. It is further apparent that if the meta-nitrotoluene were converted to the meta-toluidine, a still further reduction in quantity might take place. Therefore, it can be seen from the commercial standpoint, that the supply of meta-toluidine is more or less limited to the demands for o- and p-toluidine and to these compounds in relatively pure condition. For some purposes, since the meta compounds are present only in small amounts as indicated, they are not separated from the ortho and para derivatives.

Such meta compounds as meta-toluidine and derivatives are employed in the preparation of azo dyes, dyeing and other industrial purposes. With the rapidly increasing use of textile materials containing cellulose ester fibers dyed with the aforementioned type of dyestuffs, it is apparent that the demand for meta-toluidine compounds may exhaust the supply or otherwise adversely affect the market. It is therefore readily apparent that the production of meta-substituted compounds which may be employed in place of meta-toluidine and similar compounds, and processes for the manufacture of such substituted compounds is a highly desirable accomplishment.

We have found new meta-substituted compounds which may be quite readily prepared and which are satisfactory for use in dye manufacture and for other purposes for which meta-toluidine has been employed. Our new compounds function satisfactorily and in many instances give superior results.

This invention has for one object to provide novel nuclear meta-substituted phenylenediamine compounds. Another object is to provide new compounds having the probable formula:

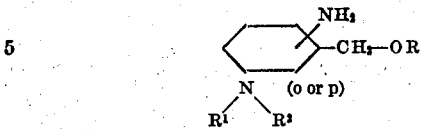

where R is hydrogen, an ether or an organic or inorganic ester group; $R^1$ and $R^2$ are hydrogen and substituted or unsubstituted alkyl, alkylene, aryl, cycloalkyl, or heterocyclic group.

Still another object is to provide new compounds having the probable formula:

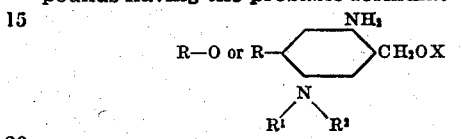

where R is a substituted or unsubstituted alkyl, alkylene, aryl, cycloalkyl or heterocyclic; $R^1$ and $R^2$ may be in addition to R, hydrogen; X is hydrogen, ester or ether.

A still further object is to provide new compounds having the probable formula:

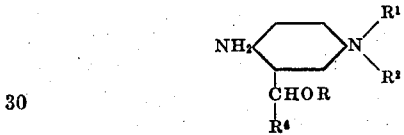

where $R^4$ is an alkyl or substituted alkyl or substituted alkyl group, $R^2$ and $R^1$ are substituted or unsubstituted alkyl, alkylene, cycloalkyl, aryl or heterocyclic groups, and R is hydrogen, an ester, or an ether group.

Still another object is to employ the aforementioned compounds as intermediates for azo dyes, anthraquinone dyes and indophenol dyes. A still further object is to employ the aforementioned novel compounds as photographic developers, both black and white and color.

Still another object is to provide a novel process for preparing the aforementioned nuclear meta-substituted phenylenediamines. Still another object is to provide a novel process for preparing meta-amino benzyl alcohols and substituted meta-amino benzo alcohols suitable for use in the production of our novel compounds aforementioned. Other objects will appear hereinafter.

Our invention may be generically illustrated to some extent by reference to the following series of formulas and reactions which broadly illustrate procedure by which the new compounds of this invention may be arrived at.

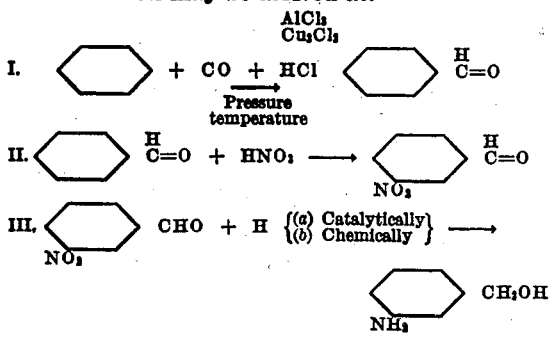

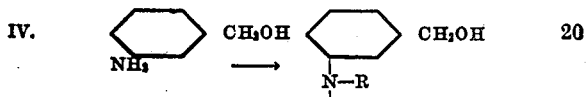

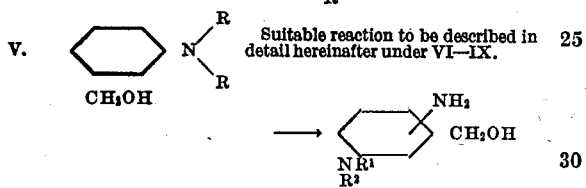

In step V suitable reactions have been referred to. For illustrating in further detail, reference is made to steps VI–IX, inclusive, which show procedure for obtaining our novel diamine compound. In considering these reactions it is pointed out, as above, that they are more or less presented for describing certain general aspects of our invention and additional details are set forth hereinafter.

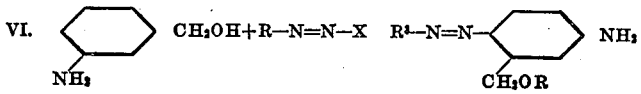

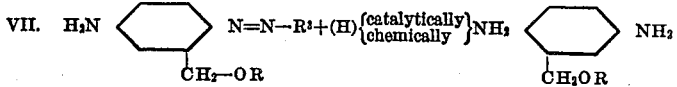

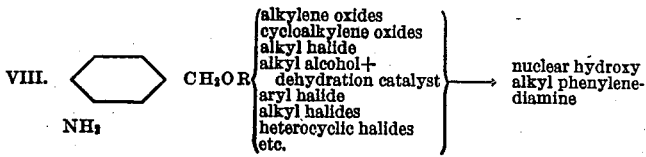

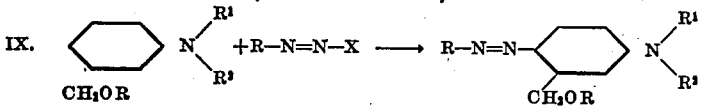

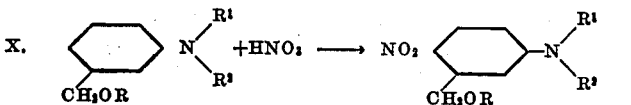

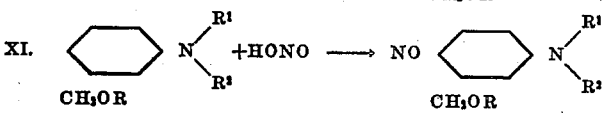

Then reduce as in VII.

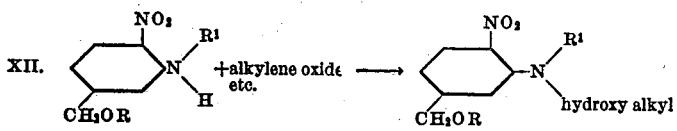

Then reduce as in VII.

In connection with Reactions VI and IX complete details are set forth in copending application 147,541 now Patent No. 2,196,221, already referred to.

From the foregoing it can be seen that one general method for obtaining our new compounds may be considered as comprising the preparation of a benzyl alcohol compound and then converting the compound to our novel diamine. Further description of the preferred steps for obtaining benzyl alcohol compounds will be set forth hereinafter. However, in order to illustrate the preferred procedure for obtaining our new nuclear hydroxy alkyl phenylenediamine compounds, the following detailed examples are set forth. The structure of the compounds which we produce may be represented by the following:

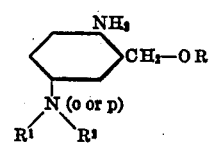

where R is hydrogen, an ether or an organic or inorganic ester group; $R^1$ and $R^2$ are hydrogen and substituted or unsubstituted alkyl, alkylene, aryl, cycloalkyl, or heterocyclic group.

Detailed procedure for obtaining such compounds is shown in the following examples:

*Example 1*

168 g. 3-amino-6-nitrobenzyl alcohol, 500 cc. ethanol and 5 g. nickel from a nickel alloy are charged into an autoclave and hydrogenated at 2–200 atmospheres pressure and 50–150° temperature. When 3 moles of hydrogen have been absorbed, the reaction product is removed after cooling and worked up. The product has the formula:

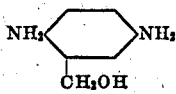

Example 2

168 g. 3-amino-6-nitrobenzyl alcohol are heated in an autoclave at 100–170° with 90 g. ethylene oxide for 1 to 5 hours. The reaction product has the formula:

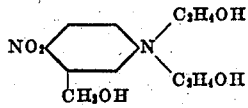

and on reduction as in Example 1 we obtain:

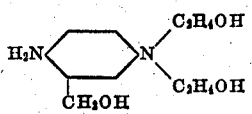

Example 3

186 g. o-chloroaniline are diazotized with aqueous sodium nitrite, for example, and coupled with 237 g.

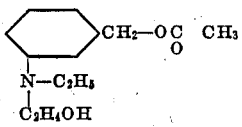

in cold dilute hydrochloric acid. The product which has the formula:

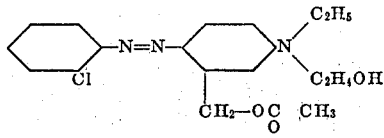

is then reduced as in 1 giving a compound having the formula:

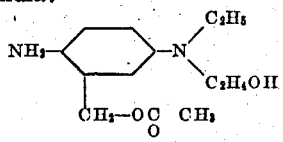

Further description relative to Example 3 showing several suitable procedures of diazotization and other details are fully set forth in our copending application 147,541, where examples are given for preparing compounds having the formula:

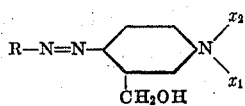

These compounds may be reduced as described in Examples 1 and 3 for obtaining our novel diamine compounds.

For further illustration a few examples are taken from our copending application:

Example 4

17.2 grams of p-bromoaniline are dissolved in 150 cc. of water and 25 cc. of 36% hydrochloric acid. The resulting solution is cooled by the addition of ice, for example, to a temperature of 0–5° C. and diazotized by the addition of 6.9 grams of sodium nitrite dissolved in water.

12.3 grams of m-aminobenzyl alcohol are dissolved in 200 cc. of water containing 15 cc. of 36% hydrochloric acid. The resulting solution is iced and the diazo solution prepared as described above is added with stirring. The solution is then slowly neutralized to Congo red paper by the addition of sodium acetate. When coupling is complete, the dye compound formed is recovered by filtration, washed with water and dried. The compound formed has the formula:

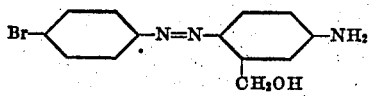

Example 5

15.1 grams of m-dimethylaminobenzyl alcohol are dissolved in 100 cc. of glacial acetic acid and the resulting solution is cooled to a temperature approximating 0–10° C. by the addition of ice. A suitable diazo solution is added with stirring and the coupling reaction which takes place is completed by adding sodium acetate until the solution is neutral to Congo red paper. The compound formed is precipitated by the addition of water, filtered, washed with water and dried. The compound formed has the formula:

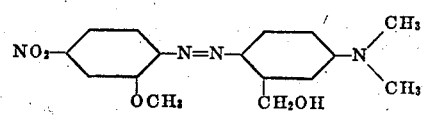

The compounds produced in Examples 4 and 5 can be reduced in accordance with the procedure of Examples 1 and 3 and our diamine compound obtained.

In the aforementioned paragraphs we have described nuclear phenylenediamine derivatives having a CH$_2$OR group. However, our invention is not limited to these exact compounds but embraces derivatives having a group such as CR$^4$HOR as well as nuclear substituted diamines having a plurality of groups such as R, RO, CR$^4$HOR, the latter group always being in the meta position. Further details respecting these other embodiments of our invention will be apparent from the description hereinafter.

In preparing these compounds meta-nitroacetophenone is obtained in some convenient manner (as for example by procedure shown in Organic Synthesis, 10, 74). This meta-nitroacetophenone may be reduced in any convenient manner to obtain m-aminophenyl methyl carbinol. After obtaining this alcoholic derivative of the aromatic compound it may be treated in a manner comparable to that already described. This treatment is generically represented by the following steps:

XIII.

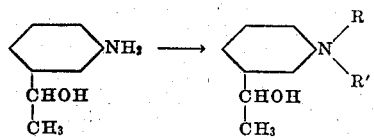

where R and R' are hydrogen and substituted alkyl, cycloalkyl, heterocyclic, alkylene, or aromatic groups.

XIV.

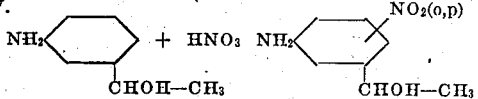

XV.

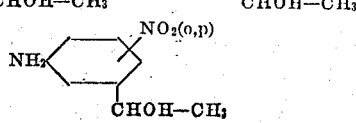

Reduce with H obtained chemically as Fe=HCl, catalytically as H+nickel catalyst.

XVI. 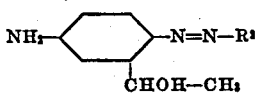

Reduce as in XV.

XVII. 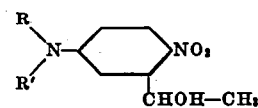

Reduce as in XV.

XVIII. 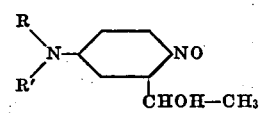

Reduce as in XV.

XIX. 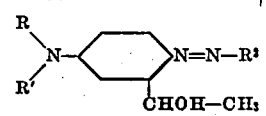

Reduce as in XV.

XX. 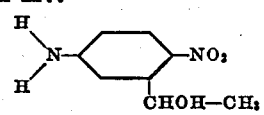

Alkylate, etc. then reduce as in XV.

The following specific examples are set forth for illustrating the preferred embodiments of procedure for carrying out the aforementioned type reaction where a diamine compound is obtained having the group $CR^4HOR$ substituted in its nucleus:

*Example 6*

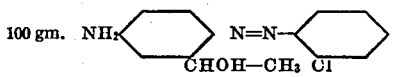

are placed in a hydrogenator with an active nickel (5 gm.) and 500 cc. methanol. The reaction is carried out at temperatures ranging between that of the room and 200° and at pressures of 3 to 200 atmospheres. When two moles of hydrogen have been absorbed, the reaction product is removed from the reaction vessel and the products are separated by distillation or steam distillation. The phenylene diamine derivative is isolated as a salt such as the sulfate, hydrochloride, etc. In a similar manner we may prepare

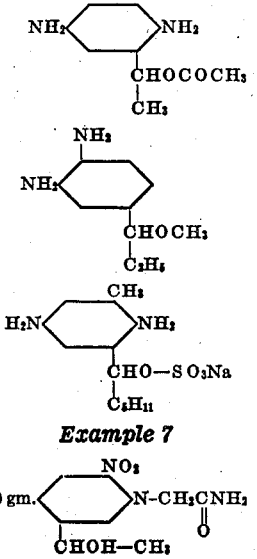

*Example 7*

100 gm. 

are hydrogenated as described in Example 6 to reduce the $NO_2$ to $NH_2$.

In a similar manner we may prepare:

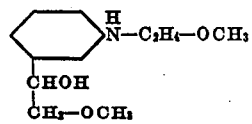

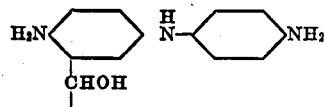

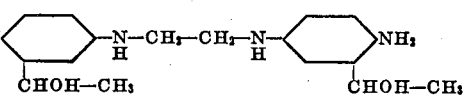

*Example 8*

100 gm. 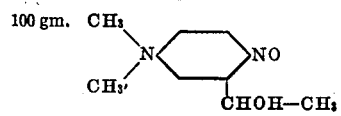

are hydrogenated as described in Example 6 to reduce the NO to $NH_2$.

*Example 9*

182 gm. 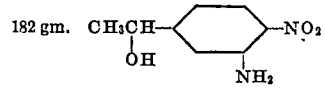

and 90 gm. ethylene oxide are heated in an autoclave at 100–200° for 1–7 hours. The reaction product has the formula:

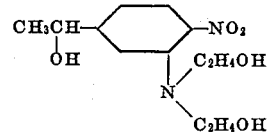

and is then hydrogenated as in Example 6 to reduce the $NO_2$ to $NH_2$.

Our novel compositions may be still further modified by including a plurality of substituents, one being in the meta position, illustrations of which are as follows:

P-tolualdehyde is prepared in a suitable manner. One method may be generically illustrated as follows:

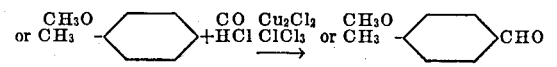

This preparation is carried out with ease, and no pressure equipment is needed to carry out the reaction under super-atmospheric pressure conditions. The aldehyde is then nitrated to give

and is reduced by methods as already described. The amino alcohol is alkylated after known methods or methods we have described above and a second amino group is introduced in general as follows:

XXI. 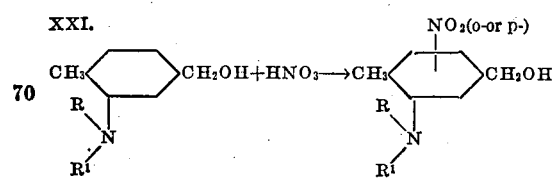

In place of $CH_3$— we may have —$C_2H_5$, $OCH_3$,

—OC₂H₅, etc. R and R' may be hydrogen and substituted or unsubstituted alkyl, alkylene, aryl, cycloalkyl or heterocyclic.

XXII.

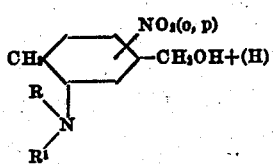

Chemically with Fe+HCl→diamine, catalytically with H+nickel.

XXIII.

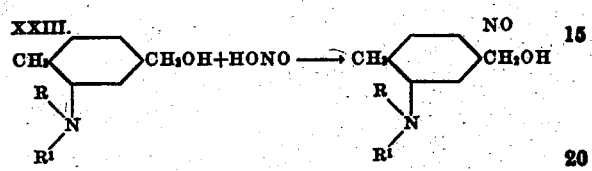

Reduce as in XXII.

XXIV.

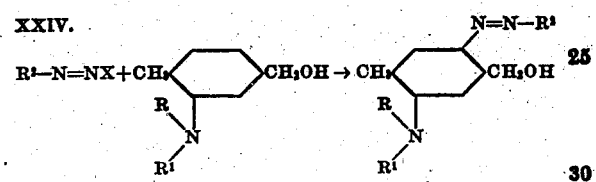

Reduce as in XXII.

XXV.

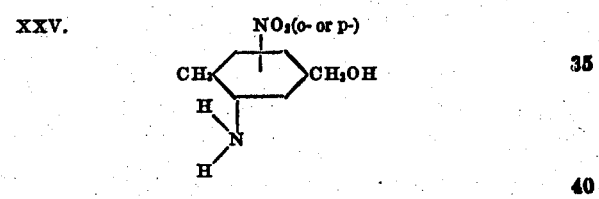

React with alkyl halides, alkyl sulfates, alkylene oxides, hydroxy alkyl halides, cyclo alkylene oxides, Cl-CH₂-CO-NH₂, Cl-CH₂-CO-OR, Br-C₂H₄-OCH₃ etc. Then reduce as in XXII.

As already indicated herein the group —CH₂OH may be esterified or etherified to give compounds having greater or lesser water solubility, depending upon the group added. Some of the ester groups that we may add are:

-C-CH₃, -C-C₄H₉, -C-C₁₅H₃₁, -C-CH=CH-C-OH, -SO₃H,
 ‖       ‖        ‖           ‖        ‖
 O       O        O           O        O

-phosphate or derivative, benzoate, etc. Of ether groups we may mention methyl, butyl, benzyl, β-hydroxy-ethyl, -CH₂-CH₂-SO₃Na, tetrahydrofurfuryl, etc.

Further details respecting these modifications of our invention will be more apparent from the following specific examples:

Example 10

100 gm. 3-amino-4-methyl-6-nitro benzyl alcohol are placed in a hydrogenator with ethanol and 5 gm. nickel and reduced at temperatures ranging between 20 and 200° and at pressure of 3 to 200 atmospheres. When 3 moles of hydrogen have been absorbed, the reaction mixture is cooled, removed from the bomb and worked up to obtain the diamino compound in the form of a suitable salt such as the hydrochloride, sulfate, etc.

In a similar manner we may prepare:

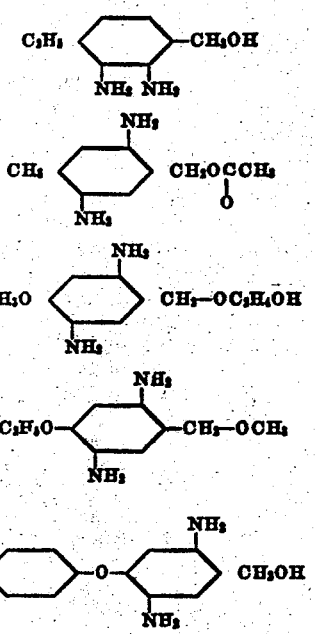

Example 11

178 gm. 3-amino-6-nitro benzyl alcohol are heated in an autoclave at 100–170° with 90 gm. ethylene oxide for 1 to 5 hours. The reaction product has the formula:

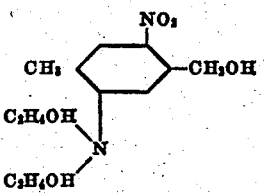

In a similar manner we may prepare:

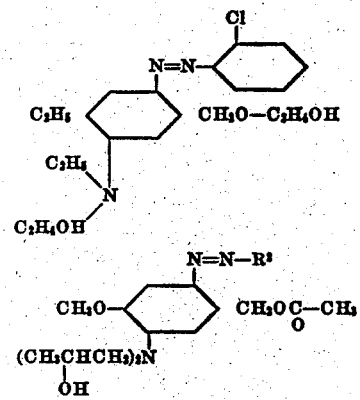

Example 12

126 gm. o-chloroaniline are diazotized in the usual manner and coupled with 250 gm.

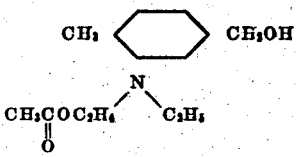

in cold dilute hydrochloric acid. Coupling is completed by adding sodium acetate. In a similar manner other derivatives of this series are prepared.

Example 13

100 gm. of the diazo derivative of Example 12 are charged into an autoclave and hydrogenated as described in Example 10. When 2 moles of hydrogen have been absorbed the reaction is complete. The reaction product has the formula:

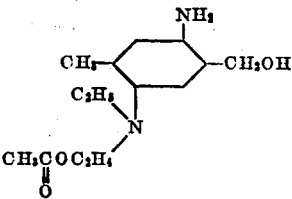

Similarly, we may prepare:

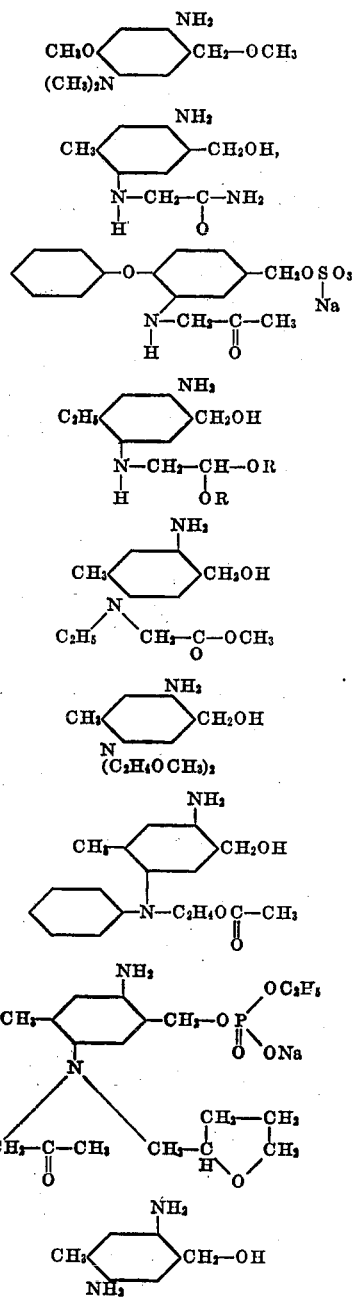

We have generically and specifically illustrated our new compounds and their methods of manufacture. These new meta-substituted aryl compounds may be employed in place of meta-toluidine compounds in dyes, dye manufacture, and for photographic and pharmaceutical purposes. We have found that our novel nuclear hydroxy alkyl phenylenediamine derivatives described herein are particularly useful for photographic purposes. Certain of these derivatives are useful not only for black and white developers but may also be used for color developers, couplers and other purposes in connection with color photography.

The nickel catalyst employed in many of the examples herein set worth was obtained from a nickel compound such as nickel silicon or nickel aluminum, the other constituents being dissolved away from the nickel to obtain a finely divided active nickel. However, our invention is not limited in this respect inasmuch as we may employ various other catalysts. We may use any of the older known catalytic preparations such as nickel on kieselguhr, prepared by any known means; nickel oxide, prepared by any known method; metallic nickel; the various noble metal catalysts, prepared from platinum, palladium, etc.; metallic catalysts such as copper, iron oxides, tin, etc. Certain newer catalysts are very good for the preparation of these compounds such as copper chromite, zinc chromium oxide, "Raney" nickel, "Adam's" platinum oxide, etc. In general, we may use one or more of the various types of catalysts described in "Hydrogenation of Organic Substances" by Carleton Ellis or any of the more recent modifications of these older catalysts.

We have found a novel method of producing benzyl alcohol which is readily illustrated by the following examples:

Example 14

100 gr. m-nitro benzyl alcohol, 200 cc. methanol and 5 gr. "Raney" nickel catalyst are charged into an autoclave and the mixture shaken with hydrogen under 2-200 atmospheres pressure at temperatures ranging from 20-200°. When hydrogenation is complete, the reaction mixture is cooled, removed from the autoclave, filtered, and the alcohol is removed by distillation. The resulting m-amino benzyl alcohol is then crystallized from benzene. There is obtained an excellent yield of the alcohol. If desired, esters or ethers of the nitro alcohol may be hydrogenated in a similar manner.

Example 15

100 gr. 3-nitro-4-methyl benzyl alcohol, 200 cc. ethyl acetate and 4 gr. copper chromite are charged into an autoclave as in Example 14. The resulting alcohol is worked up as in Example 14. In a similar manner there may be prepared

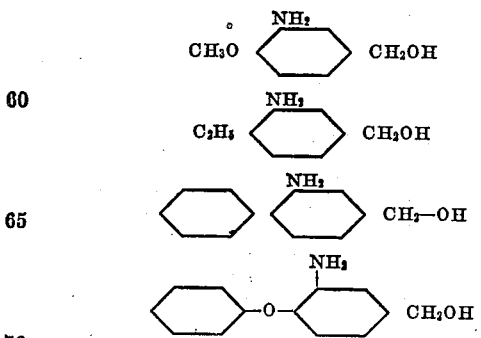

etc.

Example 16

100 gr. 3-nitro-4-ethyl benzyl alcohol, 300 cc. ethyl acetate and 1 gr. platinum oxide are shaken in a pressure bottle until the correct amount of hydrogen has been absorbed. The reaction products are removed and worked up as before.

Example 17

100 gr. m-nitro benzaldehyde, 200 cc. ethanol and 10 gr. Raney nickel are shaken in an autoclave with hydrogen at 160–175° (125 at. pressure). The hydrogenation is complete in a few minutes and the reaction product is worked up as in Example 14. There is obtained a good yield of m-amino benzyl alcohol. Similarly there may be used copper chromite, nickel or kieselguhr, platinum oxide, etc.

Example 18

100 gr. m-nitro benzaldehyde, 65 gr. acetic anhydride, 200 cc. ethyl acetate and 5 gr. Raney nickel are hydrogenated as in Example 14. There is obtained a good yield of

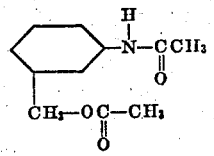

which may be hydrolyzed by known means to give the desired m-amino benzyl alcohol.

Example 19

160 gr. 3-nitro-4-ethyl benzaldehyde, 300 cc. alcohol saturated with hydrogen chloride and 1 gr. platinum oxide are reacted as in Example 16. There is obtained a good yield of

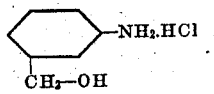

While we have illustrated a number of modifications of our invention it is to be understood that there are still further compounds which can be prepared by procedure the same or similar to that we have described. The extent of our invention will be further illustrated by the following compounds:

(1) 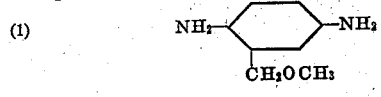

2) 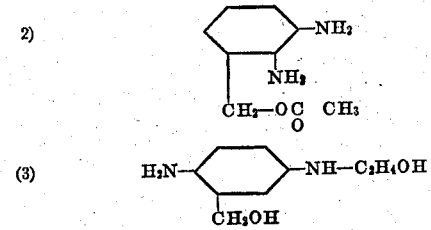

(3) 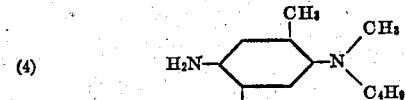

(4) 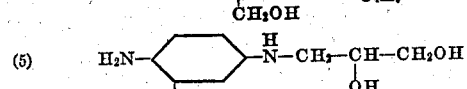

(5) 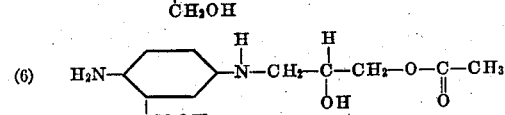

(6) 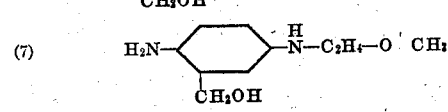

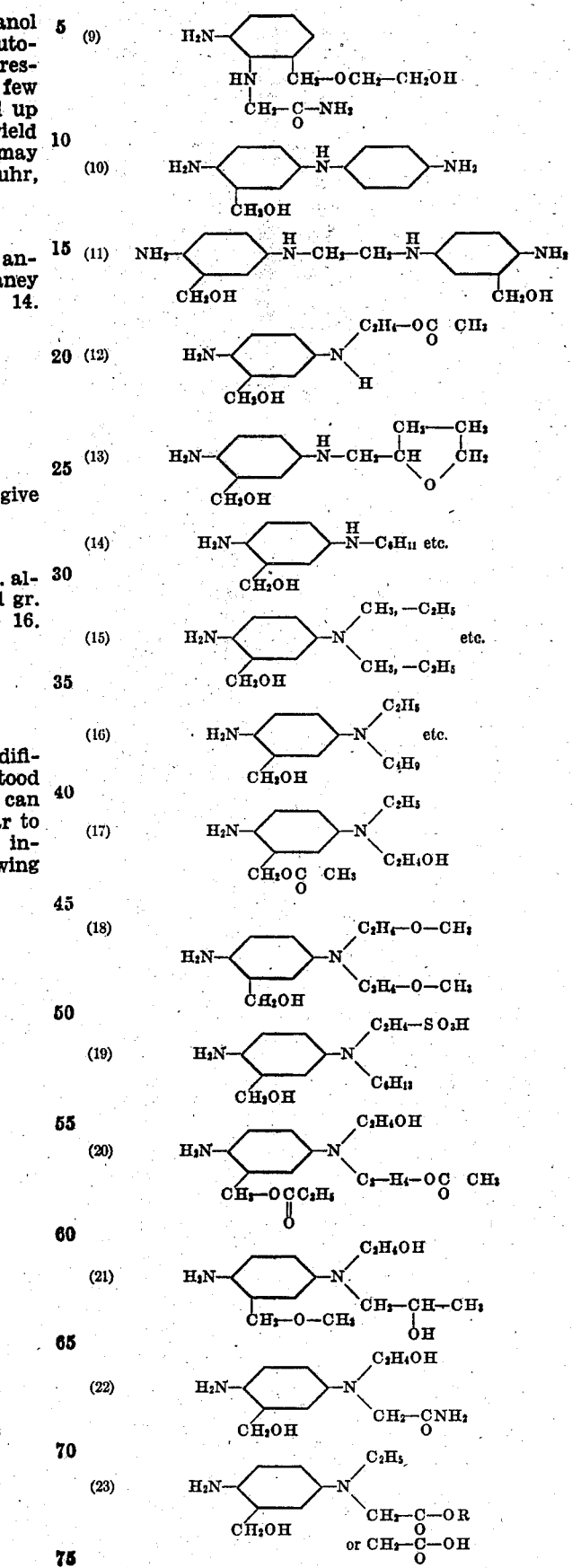

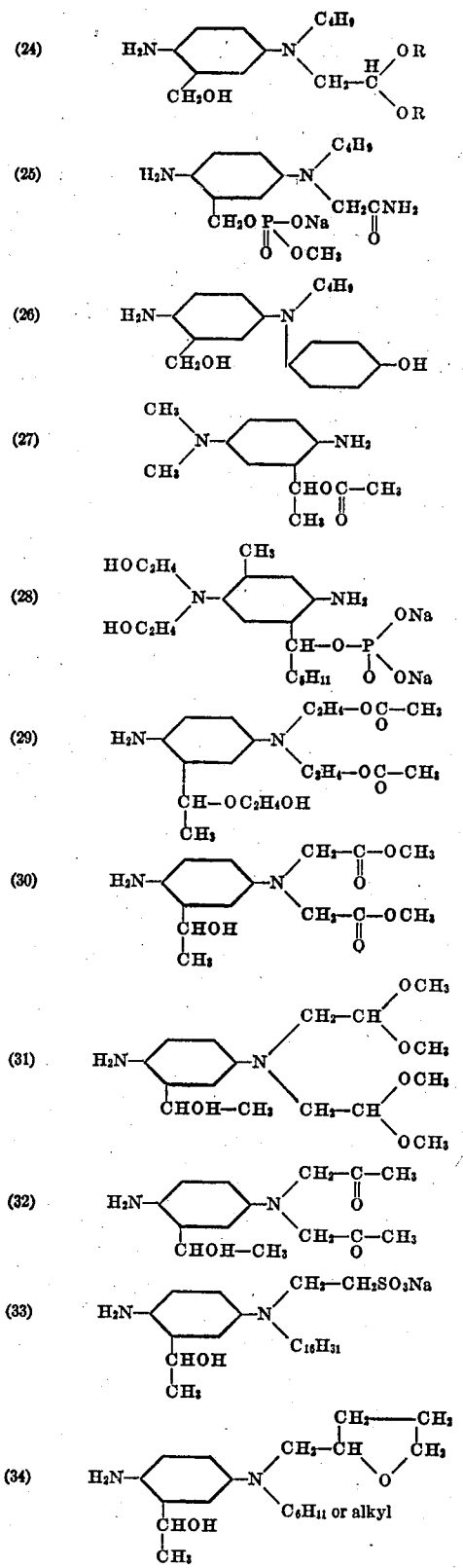

employed as couplers and for other purposes in color photography as well as black and white. Also, certain of the compounds are useful as rubber antioxidants and gum inhibitors for gasoline and other hydrocarbon materials which tend to deteriorate. It is, of course, understood that the aforementioned constituents if used for photographic purposes, may be mixed with various other alkalies such as sodium carbonate, sodium bisulfate and other common constituents employed in such industry.

The series of reactions described herein may be carried out on a large scale and furnish an attractive source of meta-compounds which not only may be substituted for meta-toluidine compounds but are competitive therewith at the present prices.

Other advantages of our invention will be apparent to those skilled in the art.

Hence, we do not wish to be restricted therein, excepting insofar as is necessitated by the prior art and the spirit of the appended claims.

What we claim and desire to be secured by Letters Patent of the United States is:

1. A compound having the formula:

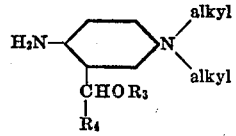

wherein $R^3$ is a member from the group consisting of hydrogen, alkyl, hydroxyalkyl, carboxylic acid acyl and $R^4$ is a member from the group consisting of hydrogen, alkyl, and alkoxy alkyl.

2. A compound having the formula:

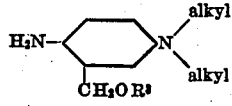

wherein $R^3$ is a member from the group consisting of hydrogen, alkyl, hydroxy alkyl, and carboxylic acid acyl.

3. A compound having the formula:

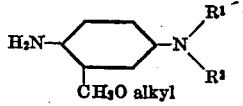

wherein $R^1$ is a member from the group consisting of hydrogen, alkyl, hydroxy alkyl, and alkoxy alkyl and $R^2$ is a member from the group consisting of hydrogen, alkyl, hydroxy alkyl, alkoxy alkyl, and lower aliphatic carboxy oxyalkyl.

4. A compound useful as a photographic developer in color photography, having the formula:

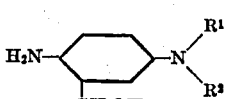

wherein $R^1$ is a member from the group consisting of hydrogen, alkyl, hydroxy alkyl, and alkoxy alkyl and $R^2$ is a member from the group consisting of hydrogen, alkyl, hydroxy alkyl, alkoxy alkyl, and lower aliphatic carboxy oxyalkyl.

5. A compound having the formula:

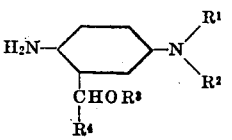

wherein $R^1$ is a member from the group consisting of hydrogen, alkyl, hydroxy alkyl, and alkoxy alkyl, $R^2$ is a member from the group consisting of hydrogen, alkyl, hydroxy alkyl, alkoxy alkyl, and lower aliphatic carboxy oxyalkyl, $R^3$ is a member from the group consisting of hydrogen, alkyl, hydroxyalkyl, and carboxylic acid acyl and $R^4$ is a member from the group consisting of hydrogen, alkyl and alkoxy alkyl.

6. A compound having the formula:

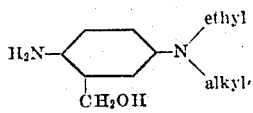

7. A compound having the formula:

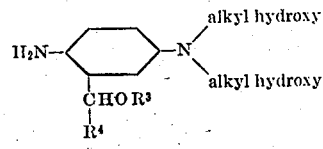

wherein $R^3$ is a member from the group consisting of hydrogen, alkyl, hydroxy alkyl, carboxylic acid acyl and $R^4$ is a member from the group consisting of hydrogen, alkyl, and alkoxy alkyl.

8. A compound capable of use as a photographic developer having the formula:

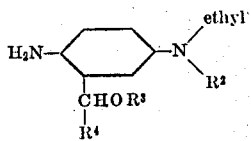

wherein $R^2$ is a member from the group consisting of hydrogen, alkyl, hydroxy alkyl, alkoxy alkyl, and lower aliphatic carboxy oxyalkyl, $R^3$ is a member from the group consisting of hydrogen, alkyl, hydroxy alkyl, carboxylic acid acyl, and $R^4$ is a member from the group consisting of hydrogen, alkyl, and alkoxy alkyl.

9. The process which comprises hydrogenating a compound having the formula:

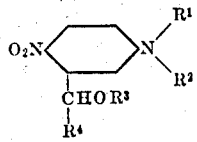

wherein $R^1$ is a member from the group consisting of hydrogen, alkyl, hydroxy alkyl and alkoxy alkyl, $R^2$ is a member from the group consisting of hydrogen, alkyl, hydroxy alkyl, alkoxy alkyl, and lower aliphatic carboxy oxyalkyl, $R^3$ is a member from the group consisting of hydrogen, alkyl, hydroxy alkyl, carboxylic acid acyl, and $R^4$ is a member from the group consisting of hydrogen, alkyl, and alkoxy alkyl, at a pressure between 2 and 200 atmospheres and a temperature between 20° C. and 150° C. in the presence of a hydrogenation catalyst.

10. The process which comprises hydrogenating a compound having the formula:

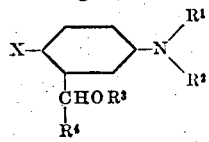

wherein $R^1$ is a member from the group consisting of hydrogen, alkyl, hydroxy alkyl, and alkoxy alkyl, $R^2$ is a member from the group consisting of hydrogen, alkyl, hydroxy alkyl, alkoxy alkyl, and lower aliphatic carboxy oxyalkyl, $R^3$ is a member from the group consisting of hydrogen, alkyl, hydroxy alkyl, carboxylic acid acyl, $R^4$ is a member from the group consisting of hydrogen, alkyl, and alkoxy alkyl, and X represents a reducible member from the group consisting of azo and nitro at a pressure between 2 and 200 atmospheres and a temperature between 20° C. and 150° C. in the presence of a hydrogenation catalyst.

JOSEPH B. DICKEY.
JAMES G. McNALLY.